US012650228B2

(12) United States Patent
Chin et al.

(10) Patent No.:    US 12,650,228 B2
(45) Date of Patent:    Jun. 9, 2026

(54) COMBUSTION APPARATUS FOR A GAS TURBINE ENGINE

(71) Applicant: ROLLS-ROYCE plc, London (GB)

(72) Inventors: Thomas A Chin, Derby (GB); Murthy V V S Ravikanti, Derby (GB); John E Rimmer, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 19/038,212

(22) Filed: Jan. 27, 2025

(65) Prior Publication Data

US 2025/0264062 A1    Aug. 21, 2025

(30) Foreign Application Priority Data

Feb. 19, 2024    (GB) ...................................... 2402326

(51) Int. Cl.
F23R 3/28    (2006.01)
F02C 9/28    (2006.01)
(Continued)

(52) U.S. Cl.
CPC ................... F23R 3/28 (2013.01); F02C 9/28 (2013.01); F23R 3/36 (2013.01); F02C 7/22 (2013.01);
(Continued)

(58) Field of Classification Search
CPC ...... F23R 3/28; F23R 3/36; F23R 3/34; F02C 9/28; F02C 7/22; F02C 7/228; F05D 2270/31
See application file for complete search history.

(56) References Cited

U.S. PATENT DOCUMENTS 4,761,948 A    8/1988 Sood et al.
5,036,657 A    8/1991 Seto et al.
(Continued)

FOREIGN PATENT DOCUMENTS

WO    2023/188984 A1    10/2023

OTHER PUBLICATIONS

Sep. 6, 2024 combined Search and Examination Report issued in British Patent Application No. 2402326.9.
(Continued)

*Primary Examiner* — Phutthiwat Wongwian
*Assistant Examiner* — Rene D Ford
(74) *Attorney, Agent, or Firm* — Oliff PLC

(57)    ABSTRACT

An aircraft including first and second like gas turbine engines having like combustion apparatus each of which includes a respective plurality of fuel injectors arranged in an annular array and having a first and second sets of fuel-emitting apertures arranged to emit fuel normally to the plane of the array and in a direction having a component in the plane of the array directed towards an adjacent fuel injector. The aircraft further includes a fuel system which for any given engine increases the proportion of the total fuel flow rate to that engine which is provided to the second set of apertures during lighting or re-lighting of that engine's combustion apparatus, or upon detection of aircraft manoeuvring likely to increase the risk of flame-out. The aircraft provides faster and more reliable lighting and re-lighting, and additional resistance to flame-out, especially for use of hydrogen fuel.

9 Claims, 5 Drawing Sheets

(51) Int. Cl.

| | |
|---|---|
| *F23R 3/36* | (2006.01) |
| *F02C 7/22* | (2006.01) |
| *F02C 7/228* | (2006.01) |
| *F23R 3/34* | (2006.01) |

(52) U.S. Cl.

CPC .......... *F02C 7/228* (2013.01); *F05D 2270/31* (2013.01); *F23R 3/34* (2013.01)

(56) References Cited

U.S. PATENT DOCUMENTS

| 5,211,005 A | 5/1993 | Hovnanian |
|---|---|---|
| 5,321,949 A | 6/1994 | Napoli et al. |
| 5,345,757 A | 9/1994 | MacLean et al. |
| 5,755,090 A | 5/1998 | Hu |
| 5,862,668 A | 1/1999 | Richardson |
| 6,968,699 B2 | 11/2005 | Howell et al. |
| 7,506,511 B2 | 3/2009 | Zupanc et al. |
| 8,122,725 B2 | 2/2012 | Myers et al. |
| 9,587,833 B2 | 3/2017 | Lee |
| 9,631,560 B2 | 4/2017 | Hoke et al. |
| 9,874,351 B2 | 1/2018 | Wolfe |
| 11,181,274 B2 | 11/2021 | Danis et al. |
| 11,988,158 B2 | 5/2024 | Meshkin Fam et al. |
| 12,467,403 B1 | 11/2025 | Durocher |
| 2004/0124282 A1 | 7/2004 | Mansour et al. |
| 2006/0156729 A1* | 7/2006 | Sprouse .................. F23C 13/02 |
| | | 60/723 |
| 2007/0039329 A1 | 2/2007 | Abreu et al. |
| 2008/0173019 A1 | 7/2008 | Kobayashi et al. |
| 2010/0162709 A1 | 7/2010 | Morgan |
| 2013/0219911 A1 | 8/2013 | Dudebout et al. |
| 2013/0340438 A1 | 12/2013 | Abreu |
| 2016/0033133 A1 | 2/2016 | Johnson et al. |
| 2016/0305667 A1 | 10/2016 | Wolfe |
| 2017/0003032 A1 | 1/2017 | Jorgensen et al. |
| 2017/0138268 A1 | 5/2017 | Nakahara |
| 2021/0095599 A1 | 4/2021 | Asai et al. |
| 2021/0180518 A1* | 6/2021 | Koganezawa ............ F23R 3/16 |
| 2023/0015930 A1 | 1/2023 | Meshkin Fam et al. |
| 2024/0210039 A1 | 6/2024 | Madden et al. |
| 2024/0263783 A1 | 8/2024 | Hu |

OTHER PUBLICATIONS

U.S. Appl. No. 19/038,249, filed Jan. 27, 2025 in the name of Ravikanti, M. et al.

Sep. 18, 2024 combined Search and Examination Report issued in British Patent Application No. 2402325.1.

Jun. 16, 2025 Extended European Search Report issued in European Patent Application No. 25152799.0.

Mar. 31, 2026 Notice of Allowance issued in U.S. Appl. No. 19/038,249.

* cited by examiner

306A3

306A2

306A1

COMBUSTION APPARATUS FOR A GAS TURBINE ENGINE

CROSS-REFERENCE TO RELATED APPLICATIONS

This application is based upon and claims the benefit of priority from United Kingdom of Great Britain & Northern Ireland patent application GB 2402326.9, filed on Feb. 19, 2024, the entire contents of which are hereby incorporated by reference.

BACKGROUND OF THE INVENTION

Field of the Invention

The invention relates to aircraft comprising gas turbine engines, for example turbofan or turboprop engines.

Description of Related Art

Flameout-out of a gas turbine engine may have one of several possible causes, for example fuel starvation or compressor stall or, specifically in the case of an aero engine, excessive altitude, severe precipitation or foreign object damage. In the case of an aero engine, flame-out is more likely during certain aircraft manoeuvres, and efficient and reliable re-lighting is of key importance. However, lighting and relighting can be difficult and unreliable, especially for certain types of fuel, such as gaseous hydrogen. For aero engines in particular, resistance to flame-out and the ability to rapidly light, and re-light after a flame-out incident, are important objectives in the design of combustion apparatus.

BRIEF SUMMARY OF THE INVENTION

According to an example, an aircraft comprises an engine system, the engine system comprising
(a) a gas turbine engine including combustion apparatus having a plurality of fuel injectors arranged in an annular array, any given fuel injector having a fuel-emitting face having a first set of fuel-emitting apertures arranged to emit fuel in a direction normal to the plane of the annular array and a second set of fuel-emitting apertures arranged to emit fuel in a direction having a component in the plane of the array directed towards the fuel-emitting face of an adjacent fuel injector, all such components having the same sense with respect to the array; and
(b) a fuel system arranged to provide fuel to the first and second sets of fuel-emitting apertures of each fuel injector of the combustion apparatus of the gas turbine engine at a total fuel flow rate or total chemical energy flow rate;
wherein the fuel system further comprises a controller arranged to receive one or more signals indicative of one or more of
(i) starting of the gas turbine engine;
(ii) flame-out of the combustion apparatus; and
(iii) manoeuvring of the aircraft associated with a risk of flame-out of the combustion apparatus, or preparation for such manoeuvring;
and in response to increase either
(a) the proportion of the total fuel flow rate or total chemical energy flow rate which is provided to the second sets of fuel-emitting apertures; or (b) the fuel flow rate or chemical energy flow rate provided to the second sets of fuel-emitting apertures.

The second set of fuel-emitting apertures of any given fuel injector may be disposed at an azimuthal edge of the fuel-emitting face of the fuel injector, the azimuthal edge being that azimuthal edge of the fuel-emitting face nearest the adjacent fuel injector. The second set of fuel-emitting apertures may be distributed radially with respect to the array.

The second set of fuel-emitting apertures of any given fuel injector may comprise at least two fuel-emitting apertures and be arranged to emit fuel in first and second directions each having a respective component in the plane of the array directed towards the fuel-emitting face of a respective adjacent fuel injector. The second set of fuel-emitting apertures may comprise first and second subsets of fuel-emitting apertures, each subset being disposed at a respective azimuthal edge of the fuel-emitting face of the fuel injector. Each subset of the second set of fuel-emitting apertures may comprise at least two fuel-emitting apertures distributed radially with respect to the array. The first set of fuel-emitting apertures may comprise a subset of fuel-emitting apertures which comprises
(a) a plurality of parallel linear arrays of apertures; or
(b) a plurality of linear arrays of apertures, each linear array lying on a respective diameter of a circular area of the fuel-emitting face of the fuel injector; or
(c) an annular aperture or a plurality of concentric annular apertures.

The fuel system may be arranged to provide a first fuel to the first set of fuel-emitting apertures of each fuel injector and a second fuel to the second set of fuel-emitting apertures of each fuel injector. The controller may be arranged to control at least one of
(a) the proportion of the total fuel flow rate or total chemical energy flow rate to the gas turbine engine which is provided to the second sets of fuel-emitting apertures of the combustion apparatus of the gas turbine engine; and
(b) the fuel flow rate or chemical energy flow rate provided to the second sets of fuel-emitting apertures of the combustion apparatus of the gas turbine engine,
in order to increase or maximise the range of the aircraft or to mitigate climate forcing produced by products of fuel combustion and/or contrails of the aircraft.

BRIEF DESCRIPTION OF SEVERAL VIEWS OF THE DRAWINGS

Examples are described below with reference to the accompanying drawings in which.

DETAILED DESCRIPTION

Figures 1, 2:
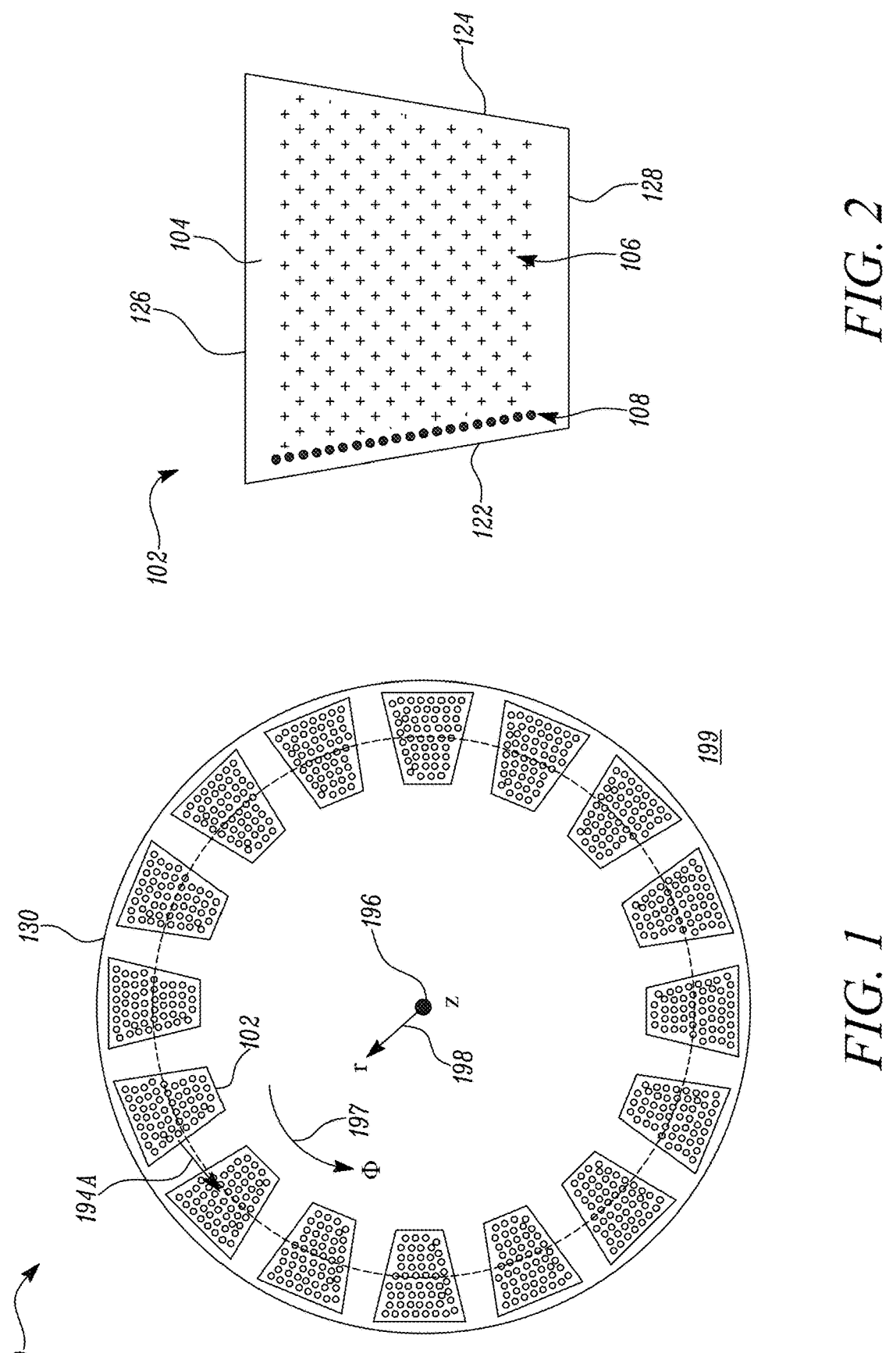
FIGS. 1, 3 & 5 show first to third example combustion apparatus respectively.
FIGS. 2, 4 & 6 each show part of a respective fuel-injector comprised in the combustion apparatus of FIGS. 1, 3 & 5 respectively.

Referring to FIGS. 1 and 2, a first example combustion apparatus 100 comprises a set of 16 like fuel-injectors 102 each having a respective fuel-emitting face 104. The fuel-emitting faces 104 of the fuel-injectors 102 are arranged in an annular, circular array such that any given fuel-injector 102 has a fuel-emitting face 104 in the plane 199 of the circular array. The fuel-injectors 102 are each located inwardly and towards one end of a cylindrical outer casing 130 having a central longitudinal axis 196, which also defines an axial direction with unit vector z. The fuel-emitting faces 104 of the fuel-injectors 102 each have the same orientation with respect to the axis 196. Azimuthal and radial directions with respect to the axis 196 are indicated by unit vectors φ 197, r 198 respectively.

The fuel-emitting face 104 of any given fuel-injector 102 has first 122 and second 124 azimuthal edges at respective azimuthal positions, first 126 and second 128 radial edges at respective radial positions and includes first 106 and second 108 sets of fuel-emitting apertures. The first set 106 of fuel-emitting apertures is made up of substantially parallel linear arrays of apertures, each of which is arranged to emit fuel in a direction normal to the plane 199 of the annular, circular array of fuel-injectors, i.e. parallel to the central longitudinal axis 196 of the outer casing 130 in the direction z. The second set 108 of fuel-emitting apertures is a linear array of apertures disposed at the azimuthal edge 122 of the fuel-emitting face 104 and distributed radially with respect to the axis 196 between the first 126 and second 128 radial edges of the fuel-emitting face 104. Each of the second set 108 of fuel-emitting apertures is arranged to emit fuel in a direction having a component 194A in the plane 199 directed towards the fuel-emitting face of the adjacent fuel-injector nearest the azimuthal edge 122. The components 194A associated with all the fuel-injectors 102 have the same azimuthal sense, i.e. an anti-clockwise sense in FIG. 1 when viewed in the −z direction towards the fuel-emitting faces 104 of the fuel-injectors 102, and in the direction φ. The direction (the fuel-emission direction) in which fuel is emitted by the second set 108 of fuel-emitting apertures of any given fuel-injector has in general components in the −r, φ and z directions. In variants of the apparatus 100, the fuel-emission direction may have components only in the φ and z directions (i.e. no component directed towards the axis 196) or only a component in the φ direction (i.e. no axial component and no component towards the axis 196). In a variant of the combustion apparatus 100, the second set 108 of fuel-emitting apertures of any given fuel-injector 102 is located at the azimuthal edge 124, with the component 194 being in the direction −φ, i.e. towards the fuel-emitting face of the fuel-injector which is adjacent in the clockwise direction in FIG. 1 (when viewed in the −z direction).

Figures 3, 4:
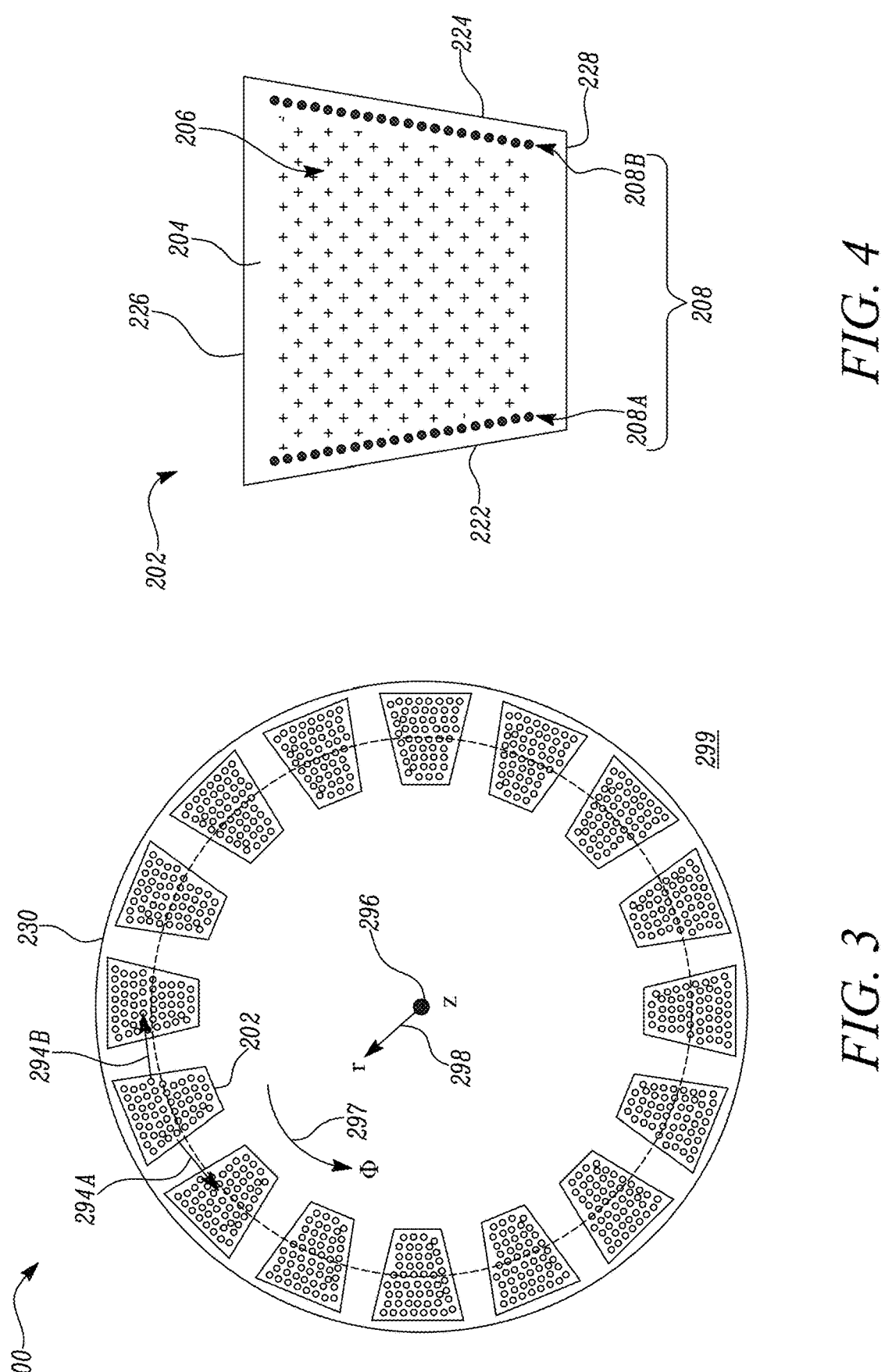
Figures 5, 6:
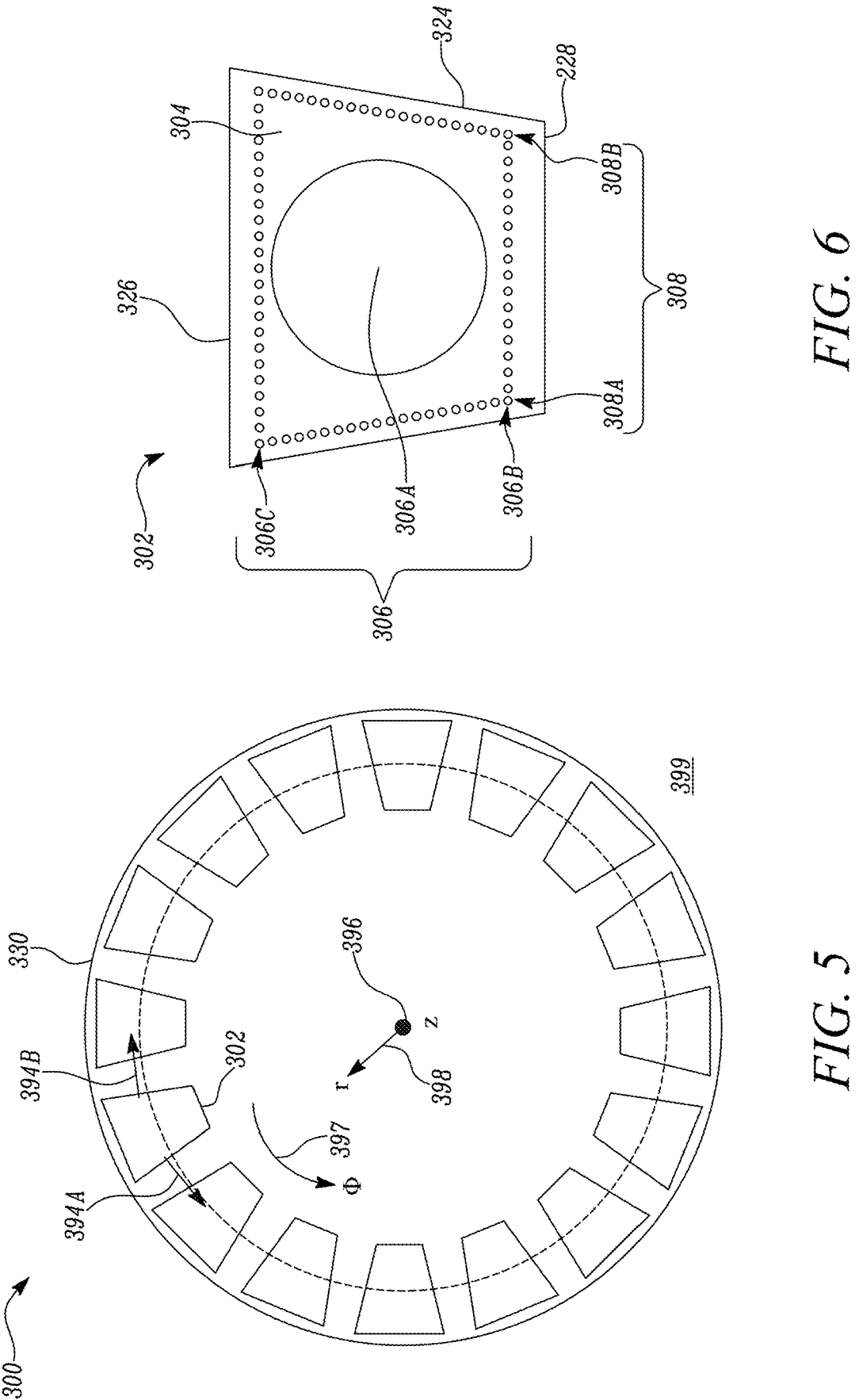
Figure 9:
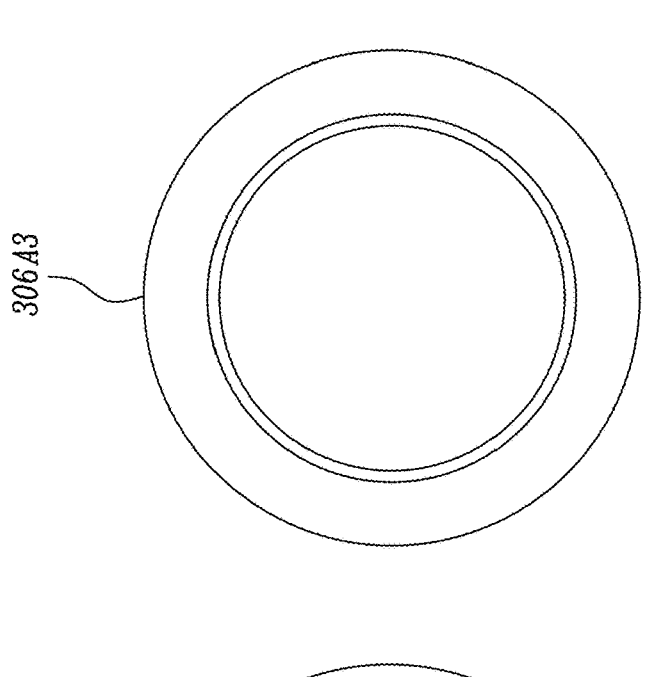
FIGS. 7-9 show alternative arrangements of fuel-emitting nozzles which may be employed in the fuel-injector of FIG. 6.
Figure 8:
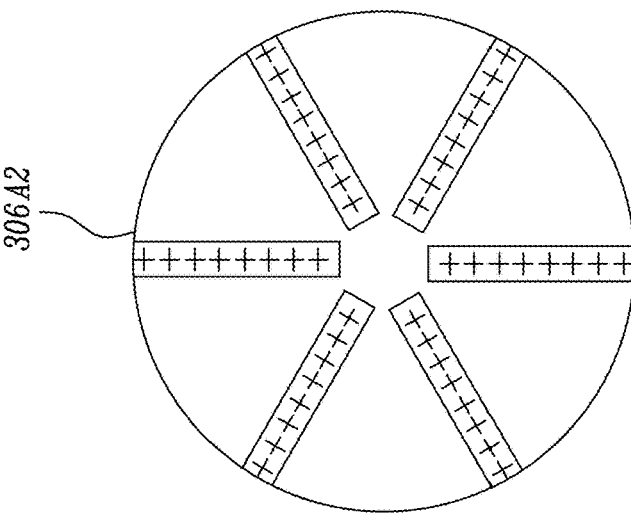
Figure 7:
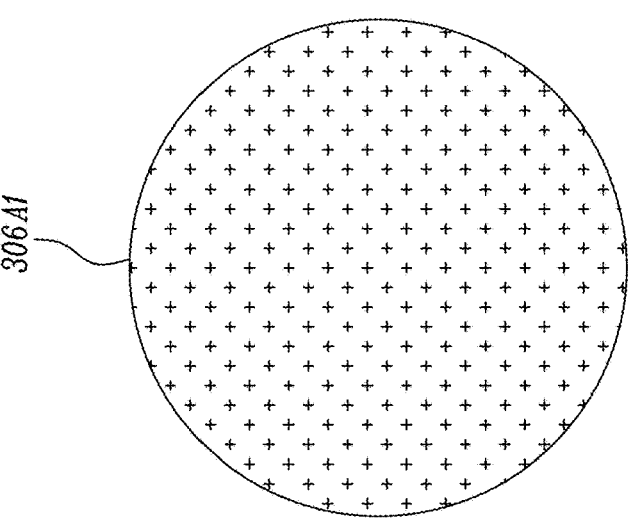

Referring to FIGS. 3 and 4, in which reference numerals differ by 100 from those labelling corresponding parts in FIGS. 1 and 2 respectively, a second example combustion apparatus 200 comprises 16 like fuel-injectors 204 arranged in an annular, circular array within a cylindrical outer casing 230. Any given fuel-injector 202 has a fuel-emitting face 204 which includes first 206 and second 208 sets of fuel-emitting apertures. The second set 208 consists of first 208A and second 208B subsets of apertures each located at a respective azimuthal edge 222, 224 of the fuel-emitting face 204, the individual fuel emitting apertures of the subsets 208A, B being distributed radially between radial edges 226, 228 of the fuel-emitting face 204. Each subset 208A, B of apertures is arranged to emit fuel in a respective direction having a component in the direction of the fuel-emitting face of the adjacent fuel-injector located nearest the azimuthal edge 222, 224 at which the subset 208A, B is located. Thus, subset 208A of apertures is arranged to emit fuel in a direction having a component 294A in the direction φ and subset 208B of apertures is arranged to emit fuel in a direction having a component 294B in the direction −φ. In variants of the combustion apparatus 20, the respective directions of fuel-emission from apertures of the subset 208A, B may each have components in either or both of the −r and z directions in addition to a component in the φ or −φ direction. Fuel is transported within the combustion apparatus 200 in both clockwise and anti-clockwise directions −φ, φ thus providing additional resistance to flame-out and faster re-lighting compared to the combustion apparatus 100 of FIG. 1.

Referring to FIGS. 5 to 9 in which reference numerals differ by 200 from those labelling corresponding parts in FIGS. 1 and 2, a third example combustion apparatus 300 comprises a circular array of 16 like fuel-injectors 302 arranged within a cylindrical outer casing 330. Any given fuel-injector 302 has a fuel-emitting face 304 having first 306 and second 308 sets of fuel-emitting apertures. The second set 308 of apertures consists of two subsets of apertures 308A, 308B located at respective azimuthal edges 322, 324 of the fuel-emitting face 304. The apertures of each subset 308A, 308B are arranged to emit fuel in respective fuel-emission directions having components 394A, 394B in the plane 399 of the circular array respectively, i.e. in the φ, −φ directions respectively. In variants of the combustion apparatus 300 the fuel emission directions associated with the subsets 308A, 308B may each have components in the z direction, or in both the −r and z directions, in addition to a component in the φ and −φ directions. Apertures of the first set 306 of fuel-emitting apertures are arranged to emit fuel in the z direction only, i.e. normal to the plane of the annular array of fuel-injectors 302 and along axis 396, in the direction z. The first set 306 is made up of subsets 306A, 306B, 306C of fuel-emitting apertures. Subsets 306B and 306C are each a linear array of apertures located at radial edges 328, 326 respectively of fuel-emitting face 304. Subset 306A may comprise a series 306A1 of parallel linear arrays of apertures (FIG. 7), a plurality 306A2 of linear arrays of apertures each lying on a respective diameter of a circular area of the fuel-emitting face 304 (FIG. 8) or one or more annular apertures 306A3 (FIG. 9), the annular apertures being concentric where there is more than one such aperture.

Any of the combustion apparatus 100, 200, 300 may be comprised in a gas turbine engine arranged to operate on any suitable fuel, for example kerosene, methane or hydrogen. The second sets 108, 208, 308 of fuel-emitting apertures each provide resistance to flame-out by providing transport of fuel between pairs of adjacent fuel-injectors 102, 202, 302. In the event of flame-out, relighting is more reliable and occurs more rapidly than is the case in similar, known, combustion apparatus. The combustion apparatus 100, 200, 300 is particularly advantageous in the case of hydrogen fuel. Flame-out and unreliable relighting are particular problems when using hydrogen in similar combustion apparatus of the prior art, due to the negligible bulk swirl of hydrogen within such apparatus.

Figures 10, 11:
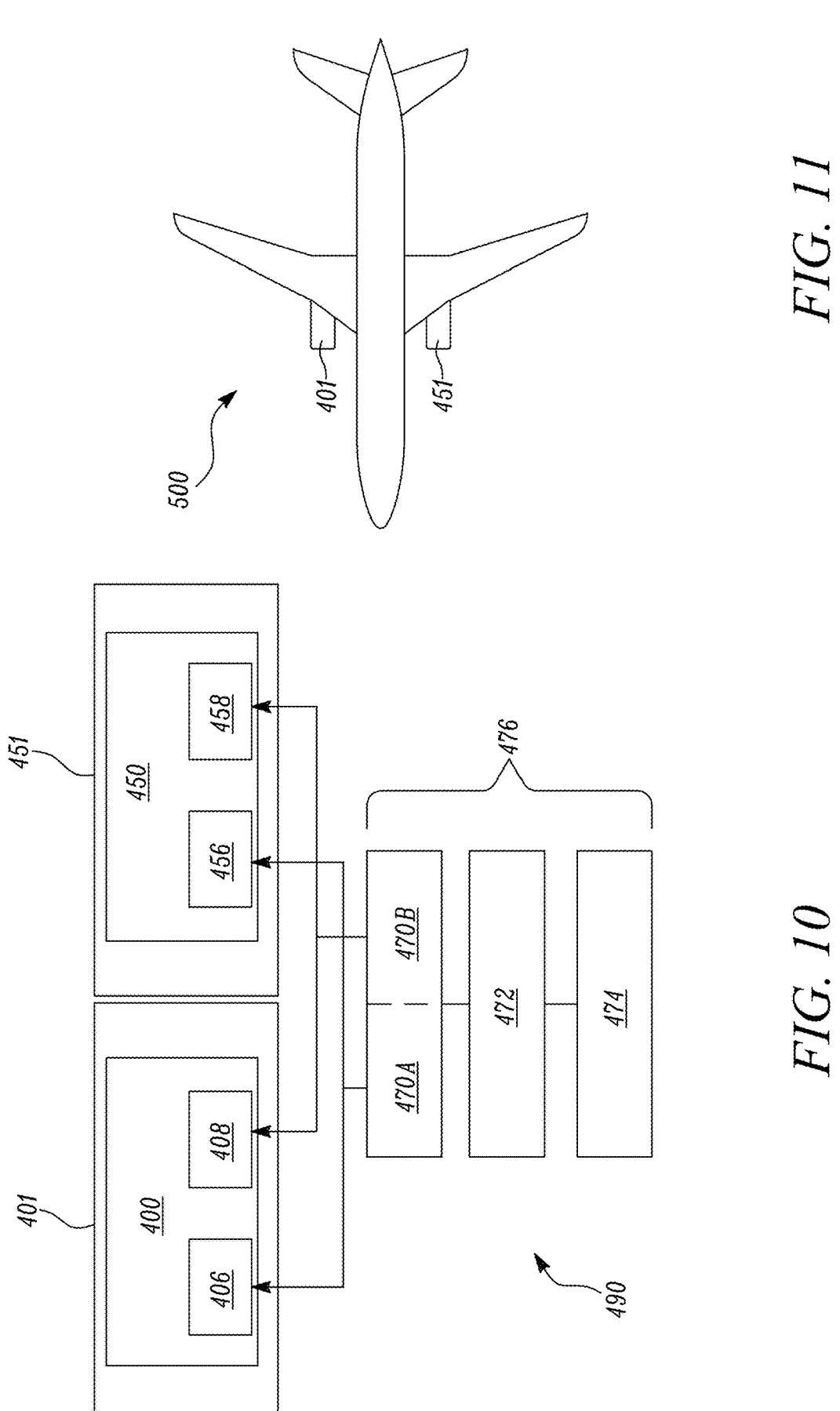
FIG. 10 shows an example engine system.
FIG. 11 shows an example aircraft comprising the FIG. 10 engine system.

Referring to FIGS. 10 and 11, an example aircraft 500 comprises an engine system 490, the engine system 490 comprising a turbofan engines 401, 451 having combustion apparatus 400, 450 respectively. The combustion apparatus 400, 450 are identical and are each the same as or similar to any of the combustion apparatus 100, 200, 300 of FIGS. 1, 3 and 5 respectively. Fuel injectors (not shown) of the combustion apparatus 400 each have a respective first set of fuel-emitting apertures, designated collectively as 406, and a respective second set of fuel-emitting apertures, designated collectively as 408. Similarly, fuel injectors (not shown) of the combustion apparatus 450 each have a respective first set of fuel-emitting apertures, designated collectively as 456, and a respective second set of fuel-emitting apertures, designated collectively as 458.

The engine system 490 further includes a fuel system 476 which includes first and second fuel tanks 470A, 470B. The first fuel tank 470A is arranged to provide fuel to the first sets 406, 456 of fuel-emitting apertures of the combustion apparatus 400, 450. The second fuel tank 470B is arranged to provide fuel to the second sets 408, 458 of fuel-emitting apertures of the combustion apparatus 400, 450. In addition to the fuel tanks 470A, 470B, the fuel system 476 comprises a controller 474 and a balance-of-fuel-system 472, the latter including one or more fuel pumps and other equipment necessary to provide fuel from the fuel tanks 470A, 470B to the sets of fuel-emitting apertures 406, 408, 456, 458.

If the first and second fuel tanks 470A, 470B contain the same type of fuel, they may be portions of a single fuel tank. If they contain different types of fuel, then they are discrete tanks. The controller 474 is arranged to receive a signal corresponding to a thrust demanded of the engine system, 490 and to provide a signal to the balance-of-fuel-system 472 such that fuel is provided from the fuel tanks 470A, 470B to the first sets 406, 456 and second sets 408, 458 of fuel-emitting apertures at a total flow rate sufficient to provide the demanded thrust. The controller 474 is also arranged to receive signals from one or more sensors (not shown) of the aircraft 500 indicative of one or more of (i) flame-out of either or both turbofan engines 401, 451;
 (ii) manoeuvring of the aircraft 500 associated with a risk of flame-out of the combustion apparatus 400, 450, or preparations for such manoeuvring; and
 (iii) starting of one or both of the turbofan engines 401, 451;

and in response provide a control signal to the balance-of fuel-system 472 such that either (a) the proportion of the total fuel flow rate or total chemical energy flow rate provided to one, or both, second sets 408, 458 of apertures of one, or both, combustion apparatus 400, 450 is increased or (b) the fuel flow rate or chemical energy flow rate provided to one or both second sets 408, 458 of apertures is increased. Lighting and re-lighting of an engine 401, 451 occurs more rapidly and with greater reliability than in the prior art, and the probability of a flame-out incident occurring during certain aircraft manoeuvres is reduced, especially in a case where hydrogen fuel is used. Also, the combustion apparatus 400, 450 provides improved resistance to flame-out during certain aircraft manoeuvres. Engine starting, and relighting after a flame-out, may involve lighting or re-lighting a particular single engine, in which case the controller 474 is arranged to increase the proportion of the total fuel flow to the combustion apparatus of that particular single engine which is provided to the second set of fuel-emitting apertures of that particular single engine.

According to another example, the aircraft 500 is a so-called "dual-fuel" aircraft and different fuel types are applied the two first 406, 456 sets and two second 408, 458 sets of fuel-emitting apertures from the (separate) fuel tanks 470A, 470B respectively. According to operational and flight requirements for maximising aircraft range, or meeting other flight mission objectives, the controller 474 is arranged to vary the proportion x of the total fuel flow (or total chemical energy flow) to the combustion apparatus

400, 450 which is provided to the two first sets 406, 408 of fuel-emitting apertures between 0 and 1, with arbitrary precision, and the corresponding proportion 1-x which is provided to the two second sets 408, 458 of apertures. An example of a flight mission objective is minimising climate forcing resulting from a flight mission caused by products of fuel combustion and/or formation of contrails.

SUMMARY OF REFERENCE NUMERALS USED IN THE ACCOMPANYING DRAWINGS

100, 200, 300, 400, 450 combustion apparatus
102, 202, 302 fuel-injector
104, 204, 304 fuel-emitting face of fuel-injector
106, 206, 306, 406, 456 fuel-emitting apertures, first set
206A & B, 306A, B & C fuel-emitting apertures, subsets of first set
108, 208, 308, 408, 458 fuel-emitting apertures, second set
208A & B, 308A & B fuel-emitting apertures, subsets of second set
122, 222, 322 first azimuthal edge of fuel-emitting face of fuel-injector
124, 224, 324 second azimuthal edge of fuel-emitting face of fuel-injector
126, 226, 326 first radial edge of fuel-emitting face of fuel-injector
128, 228, 328 second radial edge of fuel-emitting face of fuel-injector
130, 230, 330 cylindrical outer casing
194A, 294A, 394A component of fuel direction in $\phi$ direction
294B, 394B component of fuel direction in $-\phi$ direction
196, 296, 396 longitudinal axis of cylindrical casing, axial unit vector z
197, 297, 397 azimuthal unit vector $\phi$
198, 298, 398 radial unit vector r
199, 299, 399 plane of annular array of fuel-injectors
306A1-3 fuel-emitting aperture(s), subset of first set
450, 451 turbofan engine
470A, 470B fuel tank
472 balance of fuel system
474 controller
476 fuel system
490 engine system
500 aircraft

What is claimed is:

1. An aircraft comprising an engine system, the engine system comprising (a) a gas turbine engine including a combustion apparatus having a plurality of fuel injectors arranged in an annular array, each fuel injector of the plurality of fuel injectors having a fuel-emitting face comprising (1) a first set of fuel-emitting apertures arranged to emit fuel in a direction normal to a plane of the annular array and (2) a second set of fuel-emitting apertures arranged to emit fuel in a direction having an azimuthal component in the plane of the annular array directed towards the fuel-emitting face of an adjacent one of the plurality of fuel injectors, the azimuthal components all being the same for each second set of fuel-emitting apertures; and (b) a fuel system arranged to provide fuel to the first and second sets of fuel-emitting apertures of each fuel injector of the plurality of fuel injectors at a total fuel flow rate or a total chemical energy flow rate wherein each fuel-emitting face of the plurality of fuel injectors is in the plane of the annular array, the fuel system further comprises a controller arranged to receive one or more signals indicative of one or more of (i) starting of the gas turbine engine;

(ii) flame-out of the combustion apparatus; and (iii) maneuvering of the aircraft associated with a risk of flame-out of the combustion apparatus, or preparation for such maneuvering, and in response to receipt of the one or more signals, the controller is further arranged to increase either (a) a proportion of the total fuel flow rate or the total chemical energy flow rate which is provided to the second sets of fuel-emitting apertures; or (b) a fuel flow rate or a chemical energy flow rate provided to the second sets of fuel-emitting apertures.

2. The aircraft according to claim 1, wherein the second set of fuel-emitting apertures of each fuel injector of the plurality of fuel injectors is disposed at an azimuthal edge of the fuel-emitting face of the fuel injector nearest the adjacent fuel injector.

3. The aircraft according to claim 2, wherein the second set of fuel-emitting apertures of at least one of the fuel injectors is distributed radially with respect to the annular array.

4. The aircraft according to claim 1, wherein the second set of fuel-emitting apertures of each fuel injector of the plurality of fuel injectors comprises at least two fuel-emitting apertures and is arranged to emit fuel in first and second directions each having a component in the plane of the annular array directed toward the fuel-emitting face of an adjacent fuel injector of the plurality of fuel injectors.

5. The aircraft according to claim 4, wherein the second set of fuel-emitting apertures of each fuel injector of the plurality of fuel injectors comprises first and second subsets of fuel-emitting apertures disposed at respective azimuthal edges of the fuel-emitting face of the fuel injector.

6. The aircraft according to claim 5, wherein each subset of the second set of fuel-emitting apertures comprises at least two fuel-emitting apertures distributed radially with respect to the annular array.

7. The aircraft according to claim 6, wherein the first set of fuel-emitting apertures of each fuel injector of the plurality of fuel injectors comprises a subset of fuel-emitting apertures that comprises (a) a plurality of parallel linear arrays of apertures; or (b) a plurality of linear arrays of apertures, each linear array lying on a respective diameter of a circular area of the fuel-emitting face of the fuel injector; or (c) an annular aperture or a plurality of concentric annular apertures.

8. The aircraft according to claim 1, wherein the fuel system is arranged to provide a first fuel to the first set of fuel-emitting apertures of each fuel injector and a second fuel to the second set of fuel-emitting apertures of each fuel injector.

9. The aircraft according to claim 8, wherein the controller is further arranged to control at least one of (a) the proportion of the total fuel flow rate or the total chemical energy flow rate to the gas turbine engine which is provided to the second sets of fuel-emitting apertures of the combustion apparatus of the gas turbine engine; and (b) the fuel flow rate or the chemical energy flow rate provided to the second sets of fuel-emitting apertures of the combustion apparatus of the gas turbine engine, in order to increase a range of the aircraft or to mitigate climate forcing produced by products of fuel combustion and/or contrails of the aircraft.

* * * * *